(12) United States Patent
Padwekar

(10) Patent No.: US 6,317,822 B1
(45) Date of Patent: *Nov. 13, 2001

(54) INSTRUCTION ENCODING TECHNIQUES FOR MICROCONTROLLER ARCHITECTURE

(75) Inventor: Kiran A. Padwekar, Santa Clara, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,554

(22) Filed: Oct. 3, 1997

Related U.S. Application Data (63) Continuation of application No. 08/573,305, filed on Dec. 15, 1995.

(51) Int. Cl.$^7$ .................................................. G06F 9/30

(52) U.S. Cl. ........................... 712/209; 712/210; 712/229

(58) Field of Search ..................................... 395/395, 386, 395/389, 520; 712/209, 210, 229, 43

(56) References Cited

U.S. PATENT DOCUMENTS

| | | | | |
|---|---|---|---|---|
| 4,531,200 | * | 7/1985 | Whitley | 395/421.04 |
| 4,876,639 | * | 10/1989 | Mensch, Jr. | 395/500 |
| 5,274,776 | * | 12/1993 | Senta | 395/570 |
| 5,303,358 | * | 4/1994 | Baum | 395/567 |
| 5,335,331 | * | 8/1994 | Murao et al. | 395/389 |
| 5,555,423 | * | 9/1996 | Grochowski et al. | 395/570 |
| 5,638,525 | * | 6/1997 | Hammond et al. | 395/385 |

OTHER PUBLICATIONS

Intel (Intel 486 DX Microprocessor) p. 166, Jun. 1991.*

* cited by examiner

*Primary Examiner*—Eddie Chan
*Assistant Examiner*—Gautam R. Patel
(74) *Attorney, Agent, or Firm*—Blakely, Sokoloff, Taylor & Zafman LLP (57) ABSTRACT

Code and instruction encoding extensions to a microcontroller architecture provide backward compatibility with an existing microcontroller while allowing significant performance enhancements as a result to the new architecture. An extension to provide additional instruction codes has been implemented while retaining backwards compatibility so that the instructions for the prior processor retain their functionality by utilizing one unused opcode in the prior processor's opcode map. In this connection, two modes of operation are provided, namely binary and source modes. The entire instruction set is available in both modes, but the encoding is different. In the binary mode, all of the instructions of the prior processor keep their encoding. The additional instructions have an ASH prefix, ASH being the single unused opcode. In source mode, some of the instructions from the prior processor known as register instructions have the AS prefix, thereby freeing up 160 opcodes for more important instructions. Since the register-based instructions of the new processor provide better performance than the instructions that they replace, there is no need to use the old register based instructions. Therefore, adding a byte and a state to the old register instructions results in a negligible penalty. In source mode, the instructions for the new processor do not require the AS prefix. This shortens these instructions by 1 byte in length and speeds up the execution by 1 state.

6 Claims, 5 Drawing Sheets

FIG. 1

| BIN | 0-5 | 6 | 7 | 8 | 9 | A | B | C | D | E | F |
|---|---|---|---|---|---|---|---|---|---|---|---|
| SRC | 0-5 | A5x6 | A5x7 | A5x8 | A5x9 | A5xA | A5xB | A5xC | A5xD | A5xE | A5xF |
| 0 | USED | INC @R0 | INC @R1 | INC R0 | INC R1 | INC R2 | INC R3 | INC R4 | INC R5 | INC R6 | INC R7 |
| 1 | USED | DEC @R0 | DEC @R1 | DEC R0 | DEC R1 | DEC R2 | DEC R3 | DEC R4 | DEC R5 | DEC R6 | DEC R7 |
| 2 | USED | ADD A,@R0 | ADD A,@R1 | ADD A,R0 | ADD A,R1 | ADD A,R2 | ADD A,R3 | ADD A,R4 | ADD A,R5 | ADD A,R6 | ADD A,R7 |
| 3 | USED | ADDC A,@R0 | ADDC A,@R1 | ADDC A,R0 | ADDC A,R1 | ADDC A,R2 | ADDC A,R3 | ADDC A,R4 | ADDC A,R5 | ADDC A,R6 | ADDC A,R7 |
| 4 | USED | ORL A,@R0 | ORL A,@R1 | ORL A,R0 | ORL A,R1 | ORL A,R2 | ORL A,R3 | ORL A,R4 | ORL A,R5 | ORL A,R6 | ORL A,R7 |
| 5 | USED | ANL A,@R0 | ANL A,@R1 | ANL A,R0 | ANL A,R1 | ANL A,R2 | ANL A,R3 | ANL A,R4 | ANL A,R5 | ANL A,R6 | ANL A,R7 |
| 6 | USED | XRL A,@R0 | XRL A,@R1 | XRL A,R0 | XRL A,R1 | XRL A,R2 | XRL A,R3 | XRL A,R4 | XRL A,R5 | XRL A,R6 | XRL A,R7 |
| 7 | USED | MOV R0,#data | MOV @R1,#data | MOV R0,#data | MOV R1,#data | MOV R2,#data | MOV R3,#data | MOV R4,#data | MOV R5,#data | MOV R6,#data | MOV R7,#data |
| 8 | USED | MOV direct,@R0 | MOV direct,@R1 | MOV direct,R0 | MOV direct,R1 | MOV direct,R2 | MOV direct,R3 | MOV direct,R4 | MOV direct,R5 | MOV direct,R6 | MOV direct,R7 |
| 9 | USED | SUBB A,@R0 | SUBB A,@R1 | SUBB A,R0 | SUBB A,R1 | SUBB A,R2 | SUBB A,R3 | SUBB A,R4 | SUBB A,R5 | SUBB A,R6 | SUBB A,R7 |
| A | USED A5 OPEN | MOV @R0,direct | MOV @R1,direct | MOV R0,direct | MOV R1,direct | MOV R2,direct | MOV R3,direct | MOV R4,direct | MOV R5,direct | MOV R6,direct | MOV R7,direct |
| B | USED | CJNE @R0,#data,rel | CJNE @R1,#data,rel | CJNE R0,#data,rel | CJNE R1,#data,rel | CJNE R2,#data,rel | CJNE R3,#data,rel | CJNE R4,#data,rel | CJNE R5,#data,rel | CJNE R6,#data,rel | CJNE R7,#data,rel |
| C | USED | XCH A,@R0 | XCH A,@R1 | XCH A,R0 | XCH A,R1 | XCH A,R2 | XCH A,R3 | XCH A,R4 | XCH A,R5 | XCH A,R6 | XCH A,R7 |
| D | USED | XCHD A,@R0 | XCHD A,@R1 | XCHD A,R0 | XCHD A,R1 | XCHD A,R2 | XCHD A,R3 | XCHD A,R4 | XCHD A,R5 | XCHD A,R6 | XCHD A,R7 |
| E | USED | MOV A,@R0 | MOV A,@R1 | MOV A,R0 | MOV A,R1 | MOV A,R2 | MOV A,R3 | MOV A,R4 | MOV A,R5 | MOV A,R6 | MOV A,R7 |
| F | USED | MOC @R0,A | MOC @R1,A | MOC R0,A | MOC R1,A | MOC R2,A | MOC R3,A | MOC R4,A | MOC R5,A | MOC R6,A | MOC R7,A | x ranges from 0H to FH

FIG. 2

| BINARY MODE | A5x8 | A5x9 | A5xA | A5xB | A5xC | A5xC | A5xE | A5xF |
|---|---|---|---|---|---|---|---|---|
| SOURCE MODE | x8 | x9 | xA | xB | xC | xD | xE | xF |
| 0 | JSLE rel | MOV Rm, @WRj+dis | MOVZ WRj, Rm | INC Rm/ WRj/DRk, #short MOV reg, ind | | | SRA reg | |
| 1 | JSG rel | MOV@ WRj+dis, Rm | MOVS WRj, Rm | DEC Rm/ WRj/DRk, #short MOV ind, reg | | | SRL reg | |
| 2 | JLE rel | MOV Rm, @DRk+dis | | | ADD Rm, Rm | ADD WRj, WRj | ADD reg, op2 | ADD DRk, DRk |
| 3 | JG rel | MOV@DRk+dis, Rm | | | | | SLL reg | |
| 4 | JSL rel | MOV WRj, @WRjj+Dis | | | ORL Rm, Rm | ORL WRj, WRj | ORL reg, op2 | |
| 5 | JSGE rel | MOV@WRj+dis, WRjj | | | ANL Rm, Rm | ANL WRj, WRj | ANL reg, op2 | |
| 6 | JE rel | MOV WRj, @DRk+dis | | | XRL Rm, Rm | XRL WRj, WRj | XRL reg, op2 | |
| 7 | JNE rel | MOV@DRk+dis, WRj | MOV op1, reg | | MOV Rm, Rm | MOV WRj, WRj | MOV reg, op2 | MOV DRk, DRk |
| 8 | | LJMP@WRj EJMP@ DRk | EJMP addr24 | | DIV Rm, Rm | DIV WRj, WRj | | |
| 9 | | LCALL@WR ECALL@DRk | ECALL addr24 | | SUB Rm, Rm | SUB WRj, WRj | SUB reg, op2 | SUB DRk, DRk |
| A | | | BIT Instructions | ERET | MUL Rm, Rm | MUL WRj, WRj | | |
| B | | | TRAP | | CMP Rm, Rm, | CMP WRj, WRj | CMP reg, op2 | CMP DRk, DRk |
| C | | | | PUSH op1* MOV DRk, PC | | | | |
| D | | | | POP op1* | | | | |
| F | | | | | | | | | x ranges from 0H to FH

INSTRUCTION ENCODING TECHNIQUES FOR MICROCONTROLLER ARCHITECTURE

This is a continuation of application Ser. No. 08/573.305 filed Dec. 15, 1995.

FIELD OF THE INVENTION

The invention relates to microcontroller architectures, specifically techniques for ensuring compatibility between old and new members of a family of microcontroller architectures.

BACKGROUND OF THE INVENTION

As new microcontroller architectures become feasible due to cost reductions for a variety of reasons and new techniques for improving the performance of microcontrollers become available, it is desirable to provide complete compatibility between old and new members of a family of microcontrollers to protect the investment of customers in program code and expertise with a particular design. These desires result in tradeoffs between optimizing performance of a microcontroller with a new architecture while maintaining complete backwards compatibility. The present invention has particular application to an existing microcontroller sold under the product name MCS-51 by Intel Corporation and a new microcontroller known as MCS-251, also available from Intel Corporation. The major differences between the architectures of the two microcontrollers are as follows:

1. Extended code and data spaces: The MCS-51 has 256 bytes of internal data, 64K of external data, and 64K of program memory. The MCS-251 in comparison has 16M, extendible to 4G, of single address space.
2. Unified address space: Single address space in the MCS-251 makes CPU and compiler implementations easier. In the MCS-51, program memory, data memory and internal registers each lie in a separate address space.
3. Extended stack: MCS-251 provides 64K of stack space (Extendible to 4G) compared to 256 bytes on the MCS-51.
4. Extended bit addressability: In the MCS-251, the special function registers (SFRs) and directly addressable RAM are bit addressable.
5. Extended register file: MCS-251 architecture has 24 more bytes of registers than the MCS-51 architecture.
6. Instruction set: The MCS-251 architecture provides an instruction set which is a superset of the MCS-51 instruction set.
7. Availability of extended address space: The MCS-251 architecture makes the MCS-251 extended address spaces accessible to the MCS-51 instruction set. This allows existing users to utilize their investments in MCS-51 software tools to tap the benefits of the MCS-251 architecture.

In the following description, the techniques of the present invention are described with reference to the MCS-51 and the MCS-251 architectures. However, the references to these two architectures are for convenience in describing the invention with respect to real world examples. Persons skilled in the art will recognize that the invention has application to other architectures as well.

SUMMARY OF THE INVENTION

The present invention is directed to address space, code and instruction encoding extensions to a microcontroller architecture which provide backward compatibility with an existing microcontroller while allowing significant performance enhancements as a result to the new architecture. The extensions are based on the following architectural tradeoffs:

Address Space Extension

The MCS-51 architecture has 256 bytes of internal data, 64K of external data, and 64K of program memory. The MCS251 in comparison has 16M (extendible to 4G) of single address space.

The internal data memory of the MCS-51 architecture is mapped at address 0 of the MCS-251 architecture. This removes the architectural restriction on internal RAM size. It further allows a stack larger than 256 bytes without losing MCS-51 code compatibility. The stack rolls out from internal memory to external memory thus making an external stack available to existing MCS-51 programs.

The external data memory is mapped at 64K on the MCS-51 architecture. This allows instructions which move data to/from a register or accumulator from/to external memory to map to external memory (as long as there is no internal memory at 64K) without restricting the size of the internal RAM.

Program memory is mapped to FF0000. This allows the external bus, which is used for data transfer operations, to be extended beyond a 16-bit address while keeping compatibility with the MCS-51 port reset value of FF.

$\overline{PSEN}$ (program store enable) or read strobe for external fetches and $\overline{RD}$ (read) are the code and data strobes respectively for the MCS-51 architecture. The MCS-251 architecture unifies the code and data space by making $\overline{PSEN}$ and $\overline{RD}$ both address mapped code/data read strobes. This makes $\overline{PSEN}/\overline{RD}$ partitioning transparent to the software tools which do not see separate code and data spaces, but a single address space.

The MCS-51 registers R0–R7 (in four banks or 32 bytes total) have been extended to a 64 byte register file. The MCS-51 address and data registers have been mapped to this register file. This ensures compatibility while allowing the MCS-251 instructions to be used to manipulate MCS-51 registers. The data pointer (DPTR) and stack pointer (SP) are extended in the MCS-251 architecture. This allows MCS-51 users to address the MCS-251 address space, and allows them to use a larger stack.

The MCS-51 special function registers (SFRs) are carried over to the MCS-251 architecture without changing the addresses. The extended stack pointer and the data pointer have been mapped to the SFR space to allow using MCS-51 instructions to address beyond the MCS-51 address space.

Extensions to Provide MCS-51 Code Compatibility

All MCS-51 instructions retain their functionality on MCS-251. Any code relative addressing reference the current 64K page where instructions are under execution.

There are two interrupt transfers available on the MCS-251 architecture. One is fully compatible with the MCS-51 architecture. It pushes two bytes of the program counter (PC) on the stack before jumping to the interrupt vector. The instruction return from interrupt (RETI) pops two bytes of PC. This mode allows existing code which uses the instructions return from subroutine (RET) and return from interrupt (RETI) interchangeably to work. The limitation is that the code size is restricted to 64K.

The preferred mode pushes a new program status word (PSW1) of the MCS-251 and all 3 bytes of the PC. The RETI instruction pops the pushed bytes. Pushing the PSW1 ensures that interrupt service routines written for the MCS-51 can be used with new code for the MCS-251 which relies on the Z and N flags of the PSW to be unchanged. The last two bytes pushed are in the same order in the MCS-251 architecture as they are on the MCS-51 architecture. This ensures that any code that alters the return address will work.

MCS 251 Instruction Encoding

The MCS-51 architecture provides one unused opcode which does not leave much room for an architectural extension to provide additional instructions. However, changing the instruction set compromises the compatibility. Therefore, to address this issue, the MCS-251 architecture provides two modes of operation: namely binary and source modes. The entire instruction set is available in both modes, but the encoding is different. The encoding is arranged to simplify decoding. The two modes have different applications.

a) Binary Mode

In the binary mode, all 111 of the MCS-51 instructions (49 of which are single byte, 45 of which are two bytes and 17 of which are three bytes) keep their encoding. The additional MCS-251 instructions have an A5H prefix, A5H being the single unused MCS-51 opcode. This mode allows any new code to be linked to existing binaries to run without changing. Any non MCS-51 instruction however has a 1 byte size penalty and a 1 state execution time penalty. This mode is suitable for users with large existing code who do not mind the penalty for a small percentage of their code.

b) Source Mode

In the MCS-51 architecture, 32 of the 111 instructions, referred to as register instructions, using Rn (register n) or @Ri (indirect RAM address based on the address contained in register i where i is 0 or 1) in the address field, occupy 160 opcodes. In source mode, these instructions have the A5 prefix, thereby freeing up 160 opcodes for more important instructions. Since the new MCS-251 register-based instructions provide better performance than the MCS-51 instructions that they replace, there is no need to use the old register based instructions. Therefore, adding a byte and a state to the MCS-51 register instructions results in a negligible penalty. In this mode, the MCS-251 instructions do not require the A5 prefix. This shortens these instructions by 1 byte in length and speeds up the execution by 1 state. This mode is suitable for users with all new code, or those with substantial new code who can reassemble/recompile the old code.

BRIEF DESCRIPTION OF THE DRAWINGS

FIG. 2 is a table showing the instructions corresponding to opcodes 06-FF in binary mode and A506-A5FF in source mode.

DETAILED DESCRIPTION OF THE INVENTION

Figure 1:
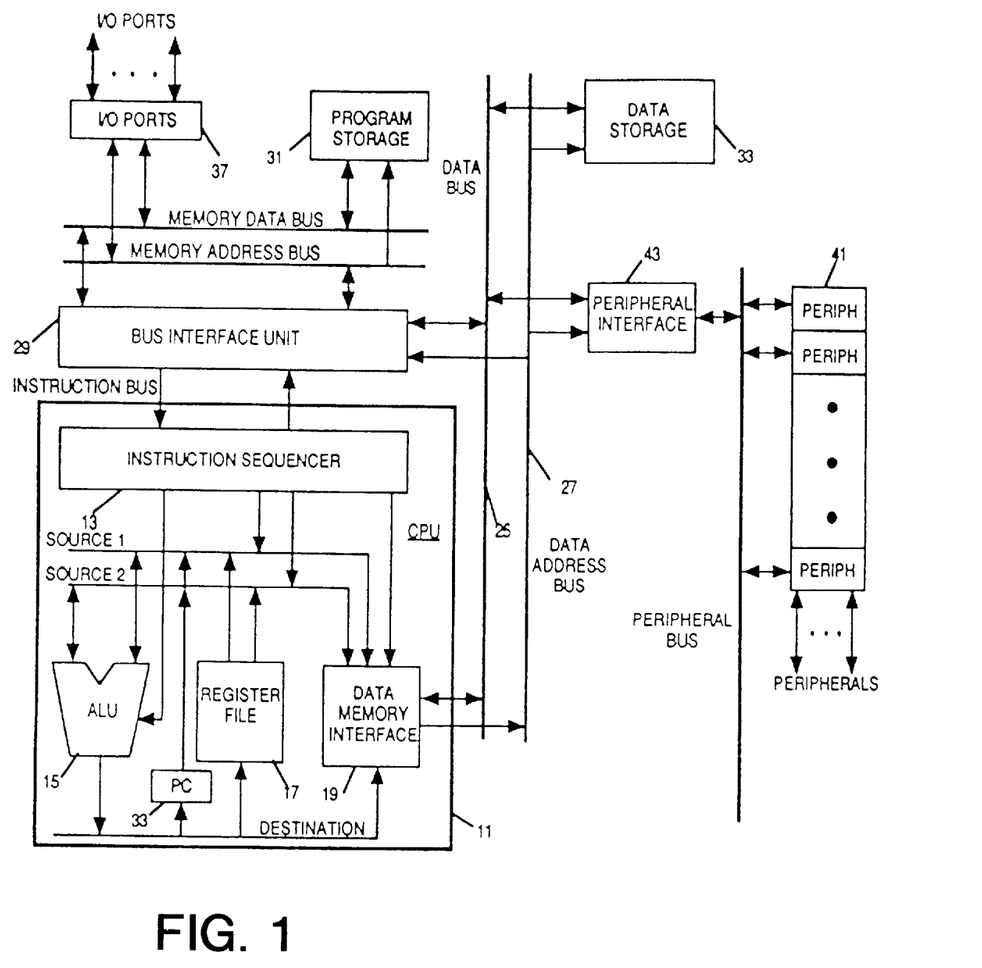
FIG. 1 is a block diagram showing the functional blocks of an architecture of a suitable microcontroller which may utilize the invented address space, code and instruction encoding extensions.

Referring to FIG. 1, the functional blocks of an architecture of a suitable microcontroller which may utilize the invented address space, code and instruction encoding extensions are shown. Although a typical microcontroller may include additional functional blocks, the functional blocks shown in FIG. 1 are sufficient for explaining how to make and use the present invention. Additionally, persons skilled in the field of the invention will recognize that numerous timing, control and power signals are needed, however, the specifics of such additional signals are highly dependent on the specifics of the microcontroller implementation and are not needed for a proper understanding of the present invention.

The microcontroller shown in FIG. 1 includes a central processing unit CPU 11 having an instruction sequencer 13, ALU 15, register file 17, data memory interface 19, program counter (PC) 23, source bus 1, source bus 2 and destination bus. The CPU communicates with the other elements of the microcontroller using a data bus 25, data address bus 27 and bus interface unit 29. Bus interface unit 29 feeds instructions to instruction sequencer 13 over an instruction bus. Instruction sequencer receives the instructions from bus interface unit 29 which are in the form of an opcode and address and/or data and decodes the received opcode, address/data information and places appropriate signals on the source 1 and source 2 buses and control signals to ALU 15 and data memory interface 19 to carry out the requested instruction in a manner well known in the art. Program storage 31 which is typically, but not always, a read only memory (ROM) is used to contain a user program which controls the operation of the microcontroller and connects to the CPU over a memory data bus and memory address bus through bus interface unit 27. Data storage 33, which is typically a random access memory (RAM), contains data used by the program in program storage 31 as it is run in CPU 11. The microcontroller communicates with the outside world using I/O ports 37 which are coupled to the memory data bus and memory address bus and peripherals 41 which are coupled to a peripheral bus and to the data bus and data address bus through peripheral interface 43. User programs may also be stored in external memories coupled to the microcontroller through I/O ports 37. Data used by running programs may also come from or be sent to peripherals 41.

The CPU accesses code and data through two different buses. Bus interface unit 29 feeds the instruction bus with code from program storage 31 or external memory, both connected to the memory bus. Internal data access is either to/from register file 17 or through the data bus which is connected to data storage 33, peripheral interface 43 and bus interface unit 29. Data accesses to peripherals connected to the peripheral bus is facilitated by peripheral interface unit 43, while accesses to peripherals through I/O ports 37 are facilitated by the bus interface unit. The bus interface unit also transfers data between the memory bus and the data bus.

The present invention lies mainly in the implementation of instruction sequencer 13 and its operation to support an existing instruction set and an expanded instruction set while maintaining full backwards compatibility. However, other aspects of the architecture of the microcontroller family used to implement the invention are described as necessary for a complete understanding of the invention. Although an understanding of the MCS-51 is presumed, further information may be found in the MCS-51 Microcontroller Handbook for the MCS-51 available from Intel Corporation.

MCS-251 Address Space

The MCS-251 architecture has one contiguous 16 megabyte address space that is used for both code and data. The 16M address space is partitioned for internal and external access, depending on the amount of on-chip memory.

MCS-251 Code Memory

Code memory can reside anywhere in the address space except for reserved areas, such as the register file. Further restrictions may prevent code execution from certain locations that can vary from product to product within the MCS-251 architecture family. Upon reset, code execution begins at address FF:0000H, after which the user can jump to any executable region within the address space. The code memory resides outside the CPU and is partitioned as internal and external memory, depending on the amount of on-chip code memory.

MCS-251 Data Memory

Data memory can reside anywhere in the MCS-251 address space except for reserved locations. The lower 32 bytes of the address space actually reside in the CPU (as part of the register file) and can be accessed as both data memory and general purpose registers. All products in the MCS-251 architecture family have this memory as part of the CPU; the amount of additional on-chip data memory varies from product to product.

MCS-251 Register File

The MCS-251 architecture supports an extra 32 bytes of registers in addition to the four banks of eight registers that the MCS-51 microcontroller architecture provides. The lower eight bytes are mapped between locations 00:00–00:1FH. The lower eight bytes are mapped in this way to support MCS-51 microcontroller register banking. The register-file can be addressed in the following ways, depending upon the registers to be accessed:

Registers 0–15 can be addressed as either byte, word, or double word (Dword) registers.

Registers 16–31 can be addressed as either word or Dword registers.

Registers 56–63 can be addressed only as Dword registers.

There are 16 possible byte registers (R0–R15), 16 possible word registers (WR0–WR30) and 10 possible Dword registers (DR0–DR28, DR56–DR60) that can be addressed in any combination outlined above. DR32–DR52 are theoretically also available in the architecture, but DR32–DR52 need not be implemented.

All Dword registers are Dword aligned; each is addressed as DRk with "k" being the lowest of the 4 consecutive registers. For example, DR4 consists of registers 4–7.

All word registers are word aligned; each is addressed as WRj with "j" being the lower of the 2 consecutive registers. For example, WR4 consists of registers 4–5.

All byte registers are inherently byte aligned; each is addressed as Rm with "m" being the register number. For example R4 consists of register 4.

MCS-251 Stack Pointer (SPX)

In addition to being a word register, DR60 is also a 16-bit stack pointer for the stack. It is used for all stack operations such as pushes/pops, calls/returns, transfer to interrupt service routine and return from interrupt service routine. Making the stack pointer part of the register file allows all MCS-251 instructions to be used for stack pointer manipulation, and enhances stack access through a rich set of addressing modes.

Program Status Word:

The Program Status Word (PSW) contains status bits that reflect the current state of the CPU. It consists of two 8-bit registers, PSW and PSW1 as shown in Table 1. The PSW register retains the existing MCS-51 microcontroller flags and the PSW1 register contains the new MCS-251 flags as well as the CY, AC, RS1, RS0, and OV flags found in the PSW. The new MCS-251 flags are Zero (Z) and Negative (N). The Zero flag is set if the result of the last arithmetic or logical operation was a zero. The Negative flag is set if the result of the last arithmetic or logical operation was negative.

TABLE 1

Program Status Word Registers

| PSW | CY | AC | F0 | RS1 | RS0 | OV | UD | P |
|---|---|---|---|---|---|---|---|---|
| PSW1 | CY | AC | N | RS1 | RS0 | OV | Z | — |

TABLE 2

PSW Bit Definitions

| Symbol | Function |
|---|---|
| CY | Carry Flag |
| AC | Auxiliary Carry Flag (For BCD Operations) |
| F0 | Flag 0 (Available to the user for General Purpose) |
| RS1 | Register bank select bit 1 |
| RS0 | Register bank select bit 0 |

| RS1 | RS0 | Working Register Bank | Address |
|---|---|---|---|
| 0 | 0 | Bank 0 | (00:00H-00:07H) |
| 0 | 1 | Bank 1 | (00:08H-00:0FH) |
| 1 | 0 | Bank 2 | (00:10H-00:17H) |
| 1 | 1 | Bank 3 | (00:18H-00:1FH) |

| Symbol | Function |
|---|---|
| OV | Overflow flag |
| UD | User definable flag |
| P | Parity Flag |
| — | Reserved for future use |
| Z | Zero flag |
| N | Negative flag |

The following is a description of how the MCS-251 microcontroller architecture supports the MCS-51 microcontroller memory organization, instruction set, and user issues as seen by an MCS-51 microcontroller user.

Code Compatibility

The MCS-251 is MCS-51 microcontroller code compatible. All MCS-51 microcontroller instructions are available in MCS-251.

Address Space Compatibility

The MCS-51 microcontroller architecture has four separate address spaces: program memory, Special Function Registers (SFRs), internal and external data memory. The MCS-251 architecture incorporates the program memory and the data memory address spaces into a 16M unified address space. The mapping is completely transparent to the user and is taken care of by the assembler.

Program Memory:

The MCS-51 microcontroller program memory space is mapped at FF:0000H, which is the MCS-251 reset vector. All MCS-51 microcontroller instructions work just as before in the 64K region starting at FF:0000H. The move code byte MOVC instructions access the same 64K region, providing MCS-51 microcontroller compatibility. The MCS-251 assembler assembles MCS-51 microcontroller code in the 64K region making the mapping transparent to the user (all origin (ORG) statements are interpreted with this mapping). The reset and interrupt vectors are correspondingly mapped, avoiding any problems on reset or interrupts.

Internal Data Memory:

The internal data memory is mapped at location 00:0000H, ensuring complete runtime compatibility. Register banking, bit addressing, direct/indirect addressing as well as stack access are MCS-51 microcontroller compatible. The MCS-251 address space begins as MCS-51 microcontroller internal data memory and extends to 16M. This allows enhanced data/stack access using new instructions while maintaining compatibility with the MCS-51 microcontroller.

Special Function Registers:

The 128-byte MCS-51 microcontroller SFR space is integrated into a 512-byte MCS-251 SFR space starting at address S:80H. This provides complete compatibility with direct addressing of MCS-51 microcontroller SFRs, including bit addressing. The address/data SFRs such as A, B, DPL, DPH, SP reside in the MCS-251 register file for high performance, however they are also mapped into the 128-byte MCS-51 microcontroller SFR region for compatibility. In the MCS-251 architecture, these SFRs can be referred to either by their MCS-51 microcontroller names, MCS-51 microcontroller SFR addresses or the MCS-251 register names as shown in Table 3.

TABLE 3

MCS-51 Microcontroller Registers in the MCS-251

| MCS-51 Microcontroller SFR Name | MCS-51 Microcontroller SFR Addresses | Registers in MCS-251 Register file | MCS-251 Register Name (byte-wide) |
|---|---|---|---|
| R0 to R7 | — | 0 through 7 | R0 to R7 |
| ACC | E0 | 11 | R11 |
| B | F0 | 10 | R10 |
| DPH, DPL | 83, 82 | 58, 59 | DR56 |
| SP | 81 | 63 | DR60 (SPX) |

For purposes of compatibility the Program Status Word (PSW) of the MCS-51 microcontroller has been retained unmodified.

External Data Memory:

The 64K MCS-51 microcontroller external data memory is mapped at 01:0000H. This provide complete run-time compatibility with the MCS-51 microcontroller, since the lowest 16 address bits of the external data memory are identical the lowest 16 address bits of the external data memory for the MCS-51 microcontroller. Keeping internal and external data memory spaces separated ensures that MOVX instructions do not access internal memory, and that MCS-51 microcontroller MOV (move byte) instructions will not access external memory.

Instruction Set Encoding

The MCS-251 opcode map is based on the MCS-51 microcontroller opcode map. It is arranged as two separate maps, namely binary compatible or assembly compatible modes, configurable at reset.

The default opcode map is the MCS-51 microcontroller map with 255 opcodes and one ESCAPE prefix (A5). The ESCAPE map allows the user to take advantage of the new MCS-251 instructions. Unused opcodes in the ESCAPE map are reserved for future use.

Figure 3:
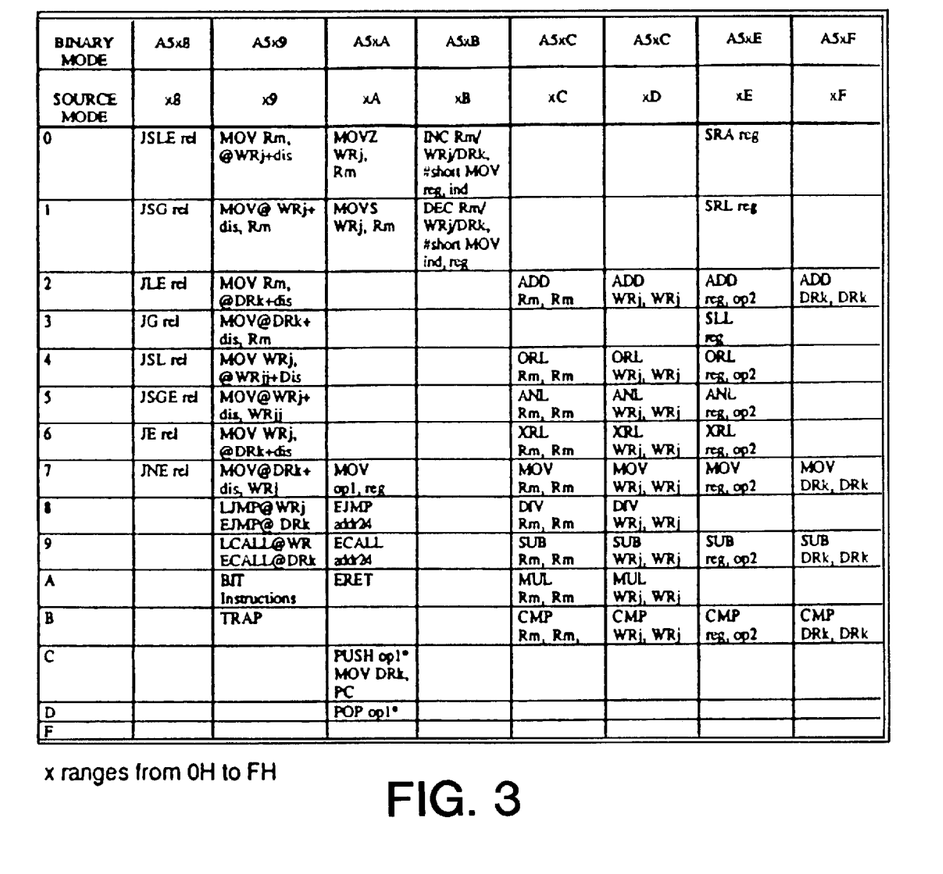
FIG. 3 is a table showing the instructions corresponding to opcodes A508-A5FF in binary mode and 08-FF in source mode.

At initialization, the user may choose to configure the microcontroller to take optimum advantage of the new MCS-251 instructions by providing an input to the microcontroller which causes a signal CFG_SRC which is input to sequencer 13 to be asserted. The opcode map remains the same except for the register based instructions of the MCS-51 microcontroller as shown in FIG. 2. The register based instructions have opcodes with the lower nibble between 6H and FH (i.e., hexidecimal 6 and hexidecimal F corresponding to decimal 6 and decimal 15 respectively). These 160 opcodes are moved to the ESCAPE map as shown in FIG. 3. The new MCS-251 instructions are moved to this freed up space. Unused opcodes are reserved for future use. The register based instructions keep the same machine code (opcode+operand bytes) except that each must now be preceded by the ESCAPE (A5) prefix. The MCS-251 instructions keep the same machine code, except they no longer need to be proceeded by the ESCAPE (A5) byte.

That is, in a 256 opcode spa c e which may be encoded as shown in FIG. 2, the only unused prefix is A5H which is shown in FIG. 2 as A5 OPEN providing a 255 opcode map. In this case, the instruction INC Rn (i ncrement Register n) encodes as $00001rrr_2$ where rrr ranges from $000_2$ to $111_2$ (0 to 7) for n ranging from 0 to 7. Thus, for register 2, the instruction would be INC R2 which would encode as $00001010_2$ or 0AH. However, in source mode, i.e., when CFG_SRC is asserted, the A5H prefix is employed, and the instruction INC Rn encodes as 1010 0101 0000 $1rrr_2$. Thus, INC R2 would encode as A50AH.

In this connection, referring to FIG. 3, in source mode, the instruction 0AH would encode as MOVZ WRj,Rm where j is 0, 2, 4 . . . 30 and m is 0 to 15. Each j is encoded as a hexidecimal number 0H-FH and each m is is encoded as a hexidecimal number 0H-FH. Thus, the instruction MOVZ WR10,R2 would encode as 0A52H.

It should be understood that the specifics of the instructions set forth in this description and FIGS. 2 and 3, including how they cause the microcontroller they are running on to operate are not important to an understanding of the invention, and the specific information provided herein is for the purpose of showing how in one particular embodiment of the invention the same opcode can function as two instructions depending on a user selectable option.

Figure 4:
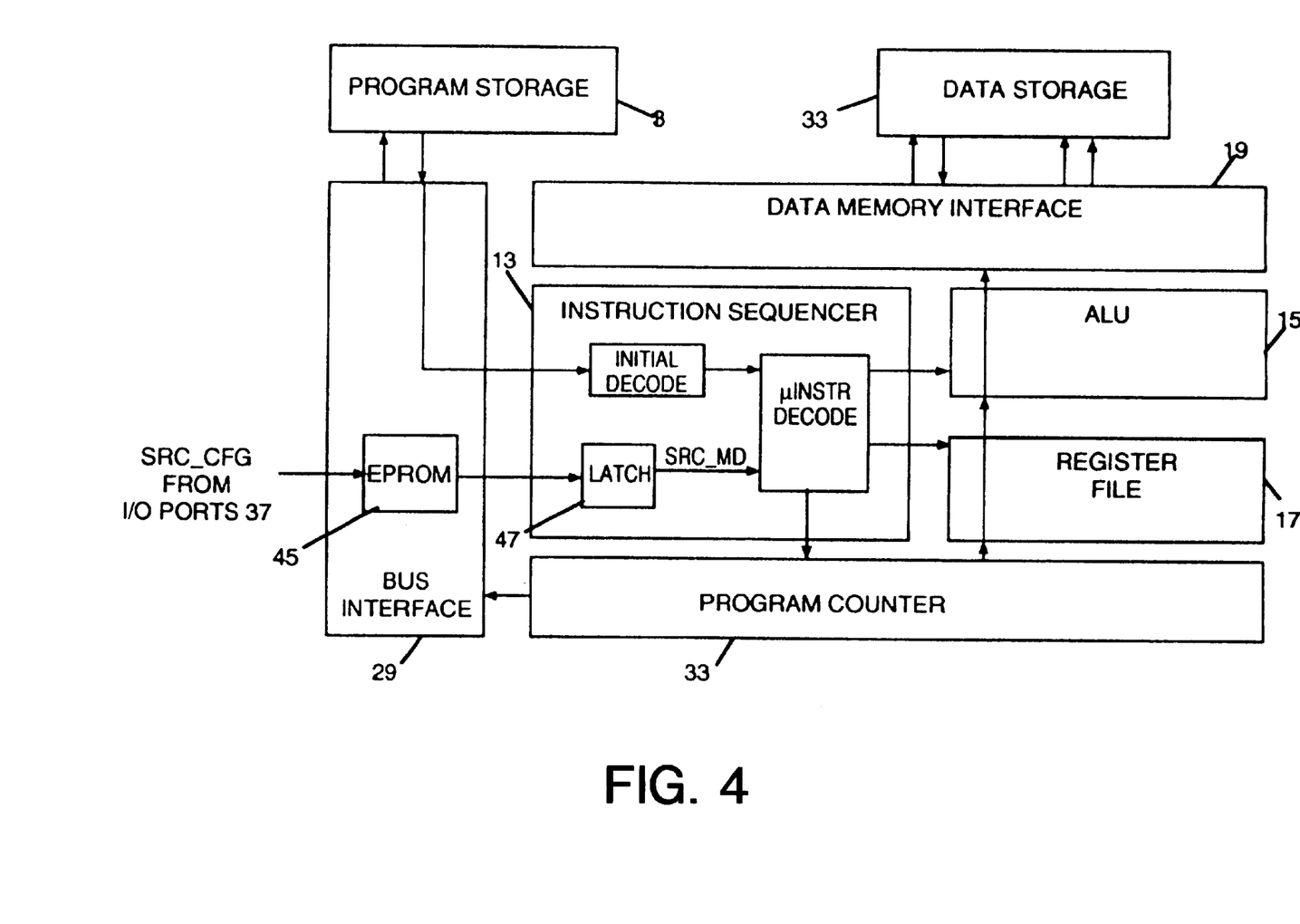
FIG. 4 is a block diagram of an instruction sequencer used to decode two different instruction sets according to the present invention.

As previously noted, the signal used to switch between the two modes of operation referred to herein as source mode and binary mode, is initialized based upon a user input. For example, in the architecture shown in FIG. 1, a signal placed on I/O ports 37 can be used to indicate whether the microcontroller is to be configured in source mode or binary mode at system start-up. The bus interface unit receives this signal from the memory data bus and stores the signal value (i.e., 0 or 1) in a memory such as an EPROM. The value stored in the EPROM is passed to the instruction sequencer over the instruction bus during system initialization as the CFG_SRC signal. Referring now to FIG. 4, upon receiving the CFG_SRC signal, previously stored in a memory such as EPROM 45 from the bus interface unit 29, the signal is latched in latch 47 forming a bit (SRC_MD) within instruction sequencer 13 which is set or reset and as instructions are decoded by instruction sequencer 13 into micro-instructions which control the operation of CPU 11, the state of the SRC_MD bit is used to determine whether the incoming instructions should be interpreted as source mode instructions or binary mode instructions. The implementation details of an instruction sequencer which can operate in this dual mode fashion are highly dependent on the overall microcontroller architecture. However, the implementation details for providing a SRC_MD or equivalent bit in any particular instruction sequencer should be readily apparent from this description.

Figure 5:
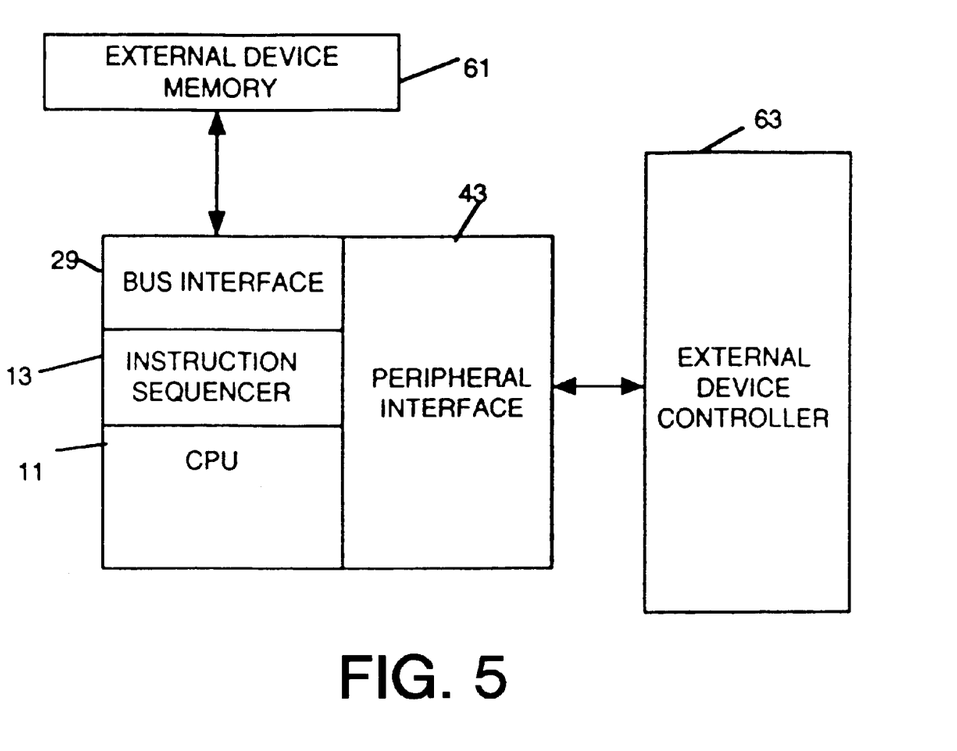
FIG. 5 shows a system in which a microcontroller incorporating the inventive elements may be used.

Referring now to FIG. 5, a microcontroller having the invented instruction sequencer 13 with dual mode operation capability is shown connected to an external device such as a scanner, copier, point of sale terminal, CD-ROM drive, tape drive, telephone switch or the like having a memory 61 connected to the microcontroller bus interface 29 and external device controller 63 coupled to the microcontroller peripheral interface. The specifics of these connections are highly device dependent, are well known to persons skilled in the art and are not needed for an understanding of the invention. In the configuration shown in FIG. 5, a complete system for performing a particular device dependent function is provided.

The specifics of the implementation details set forth herein are provided by way of example only to illustrate the concepts forming the invention and should not be construed as limiting the scope of the invention since other microcontroller or microprocessor architectures may utilize an entirely different implementation. However, the various changes which would be needed to implement the invention for other architectures should be readily apparent to persons skilled in the art.

I claim:

1. A microcontroller comprising:

a) means for receiving a signal from an external source, said signal having a value which is stored in a memory;

b) instruction decoder means adapted to operate in one of two predetermined modes depending on the state of said stored value, each of said predetermined modes adapted to operate on one of a first and a second predetermined instruction set, said second predetermined instruction set being a superset of said first predetermined instruction set, said first and second predetermined instruction sets each including a plurality of opcodes which are used to specify a particular instruction in its corresponding instruction set;

wherein one of said opcodes in said first predetermined instruction set is unused and said unused opcode is used as a prefix to predetermined instructions in said first instruction set when said decoder is operating in a first one of said two predetermined modes and said unused opcode is used as a prefix to predetermined instructions in said second instruction set when said decoder is operating in a second one of said two predetermined modes, further wherein said prefix is used by said decoder to distinguish between two instructions having the same opcode and is used only for a subset of instructions within said first instruction set and for a subset of instructions within said second instruction set.

2. The microcontroller defined by claim 1 wherein said receiving means comprises an input port of said microcontroller coupled to a bus interface unit, said bus interface unit coupled to said decoder means which includes a latch to capture the signal input via said input port during initialization of said microcontroller.

3. The microcontroller defined by claim 1 wherein said instruction decoder means comprises a latch for latching said received signal and a micro-instruction sequencer for receiving instructions and generating control signals and data which cause a central processing unit of said microcontroller to operate in a predetermined manner based upon said received instructions and said latched received signal.

4. A system for controlling a device comprising:

a) a microcontroller including:

i) means for receiving a signal from an external source, said signal having a value which is stored in a memory;

ii) instruction decoder means adapted to operate in one of two predetermined modes depending on the state of said stored value, each of said predetermined modes adapted to operate on one of a first and a second predetermined instruction set, said second predetermined instruction set being a superset of said first predetermined instruction set, said first and second predetermined instruction sets each including a plurality of opcodes which are used to specify a particular instruction in its corresponding instruction set;

wherein one of said opcodes in said first predetermined instruction set is unused and said unused opcode is used as a prefix to predetermined instructions in said first instruction set when said decoder is operating in a first one of said two predetermined modes and said unused opcode is used as a prefix to predetermined instructions in said second instruction set when said decoder is operating in a second one of said two predetermined modes, further wherein said prefix is used by said decoder to distinguish between two instructions having the same opcode and is used only for a subset of instructions within said first instruction set and for a subset of instructions within said second instruction set, b) said device having a device memory coupled to a bus interface of said microcontroller and a device controller coupled to a peripheral interface of said microcontroller.

5. A microcontroller comprising:

an instruction decoder adapted to operate in a first mode and a second mode;

a first plurality of opcodes, said first plurality of opcodes including at least one unused opcode; and a second plurality of opcodes;

wherein when said instruction decoder operates in said first mode, said unused opcode is used as a prefix that is affixed individually to at least a portion of said second plurality of opcodes that is used in said first mode.

6. The microcontroller defined by claim 5 wherein when said instruction decoder operates in said second mode, said unused opcode is used as said prefix that is affixed individually to at least a portion of said first plurality of opcodes that is used in said second mode, said instruction decoder distinguishing an opcode from said first plurality of opcodes and an opcode from said second plurality of opcodes using said prefix.

* * * * *

UNITED STATES PATENT AND TRADEMARK OFFICE
CERTIFICATE OF CORRECTION

PATENT NO. : 6,317,822 B1  Page 1 of 1
DATED : November 13, 2001
INVENTOR(S) : Hazra et al.

It is certified that error appears in the above-identified patent and that said Letters Patent is hereby corrected as shown below:

<u>Title page,</u>
Item [57], ABSTRACT,
Line 14, delete "ASH prefix", insert -- A5H prefix --, (both occurrences).
Lines 17 and 24, delete "AS prefix", insert -- A5 prefix --.

<u>Column 7,</u>
Line 66, delete "spa c e" insert -- space --.

Signed and Sealed this

Fifteenth Day of October, 2002

*Attest:*

*Attesting Officer*

JAMES E. ROGAN
*Director of the United States Patent and Trademark Office*